United States Patent [19]
Storey

[11] 3,777,935
[45] Dec. 11, 1973

[54] PULSE CAPTURE UNIT AND APPARATUS FOR CONTROLLING THE BLENDING OF TWO FLOWABLE SUBSTANCES

[76] Inventor: William Arthur Storey, "Little Beeches," Ashley Park Ave., Walton-on-Thames, England

[22] Filed: Jan. 10, 1972

[21] Appl. No.: 216,492

[30] Foreign Application Priority Data
Oct. 19, 1971 Great Britain.................... 48,595/71

[52] U.S. Cl........................ 222/16, 222/26, 222/76, 235/151.34
[51] Int. Cl.............................................. B67d 5/30
[58] Field of Search.................... 235/151.34, 92 FL; 222/14, 15, 16, 20, 26, 36, 37, 76

[56] References Cited
UNITED STATES PATENTS
| | | | |
|---|---|---|---|
| 3,219,046 | 11/1965 | Waugh...................... | 235/151.34 X |
| 3,229,077 | 1/1966 | Gross............................. | 235/151.34 |
| 3,259,141 | 7/1966 | Brendon........................ | 235/151.34 |

Primary Examiner—Robert B. Reeves
Assistant Examiner—David A. Scherbel
Attorney—Paul Bogdon

[57] ABSTRACT

A device is described which will accept trains of pulse signals on inputs thereof and will provide corresponding trains of pulse signals on corresponding outputs such that the number of pulse signals in the train at any of these outputs is equal to the number of pulse signals on the train at the corresponding input and such that there is never coincidence of pulse signals on these outputs regardless of whether or not there is coincidence of pulse signals on the inputs. In application of the device to a blending system two pipe lines for fluids to be blended have respective pulse transducers connected to respective inputs of such a device. The transducer for the minor component of the blend provides its pulses via said device to a counter which on reaching a predetermined count corresponding to the volume of the minor component in a standard quantity of the desired blend produces a signal to close a valve in the minor component flow line. The pulses at both outputs of said device are counted together by a further counter which on reaching a count corresponding to said standard quantity re-sets the first mentioned counter causing said valve in the minor component flow line to open again.

15 Claims, 2 Drawing Figures

PULSE CAPTURE UNIT AND APPARATUS FOR CONTROLLING THE BLENDING OF TWO FLOWABLE SUBSTANCES

This invention relates to a device for producing at each of a plurality of outputs thereof a train of pulses each corresponding to a respective pulse at a respective input of the device, such that pulses on respective said outputs are never coincident regardless of whether or not pulses at the respective inputs are coincident, and the invention also relates to blending control means for flowable materials utilising such a device.

According to one aspect of the invention such a device includes means arranged to produce pulses at a plurality of outputs thereof in a repeating sequence (also called a pulse sequence means), and a plurality of units each having an input and an output, and each arranged to detect the occurrence of a signal at its input during a complete sequence and to deliver a pulse at its said output on the occurrence of a pulse on the respective output of said first mentioned means.

Further aspects of the invention will be apparent from the following description with reference to the accompanying drawings in which.

Figure 1:
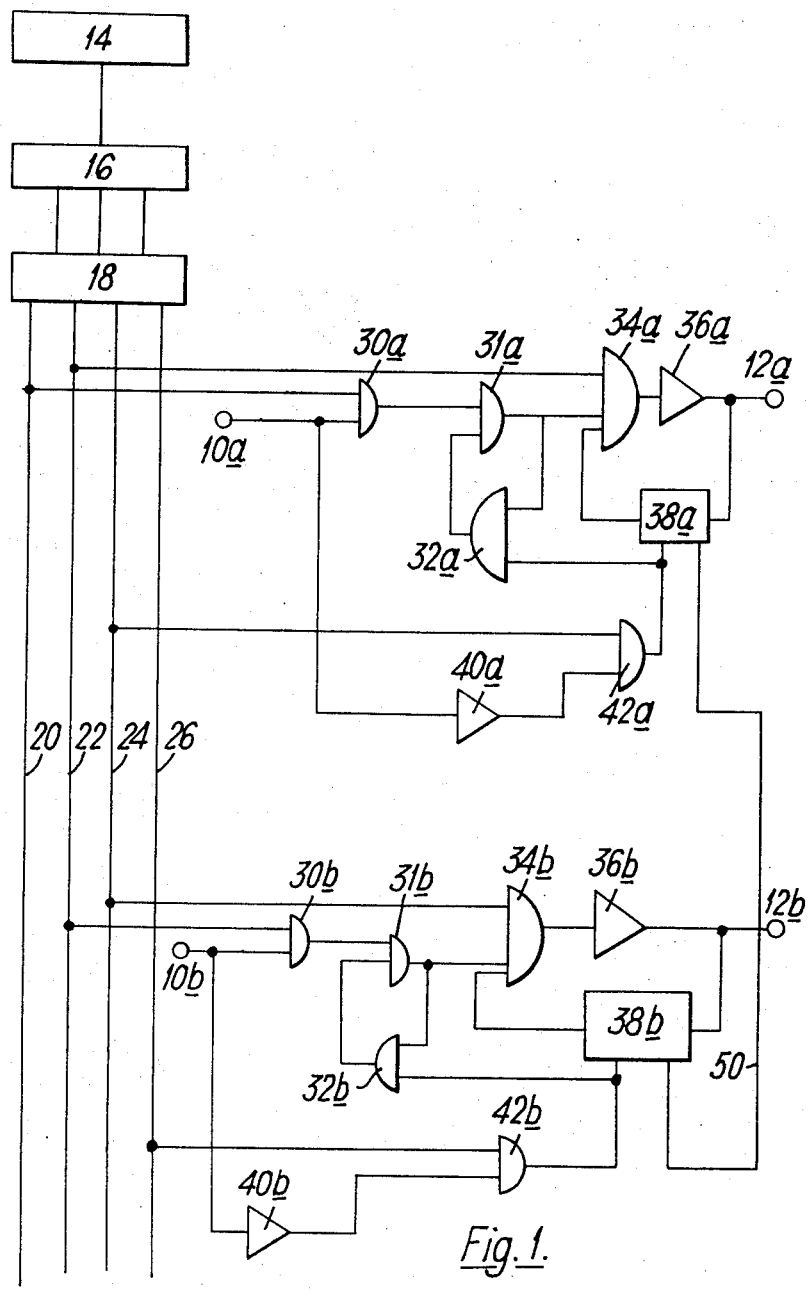
FIG. 1 is a schematic diagram of a device according to the invention.

Referring to FIG. 1, the device shown therein has inputs 10a and 10b and outputs 12a and 12b and it is the purpose of the device to produce at the output 12a a pulse for every pulse received at the input 10a, and at the output 12b, a pulse for every pulse received at the input 10b, such that a pulse on the output 12a can never coincide with a pulse at the output 12b regardless of whether or not there is coincidence of the corresponding pulses at the inputs 10a and 10b.

The device includes an oscillator 14 the output of which is fed to a counter 16 having an associated decoder 18 with four output lines 20, 22, 24 and 26 the decoder being arranged so that for successive oscillator pulses produced, a pulse of the same length as the corresponding oscillator pulse will appear only on the line 20, at the next oscillator pulse a similar pulse will appear only on the line 22, at the next oscillator pulse a similar pulse will appear only on the line 24, at the next oscillator pulse a similar pulse will appear only on the line 26, at the next only on the line 20 and so on.

The frequency of the oscillator is chosen so that its period is less than one-fourth of the minimum pulse length, and less than one-fourth of the minimum spacing between pulses, of the pulse trains to be applied at either of the inputs 10a or 10b.

The input 10a is connected to a unit comprising a 'NAND' gate 30a with two inputs one of which is connected to the input 10a. The output of the gate 30a is connected to the 'set' input of a crossed 'NAND' gate flip-flop comprising 'NAND' gates 31a and 32a. The output of the latter flip-flop is connected to one input of a three input 'NAND' gate 34a the output of which is connected via an invertor 36a to the output 12a. The output of the invertor 36a is connected to a re-set input of a flip-flop 38a having its output connected to another of the inputs of the 'NAND' gate 34a.

The input 10a is also connected via an inverter 40a to one input of a 'NAND' gate 42a the output of which is connected to a 'set' input of the flip-flop 38a and to the re-set input of the flip-flop 31a, 32a. The other input of the 'NAND' gate 42a is connected to output line 24 the other input of the 'NAND' gate 30a is connected to the line 20 and the remaining input of the 'NAND' gate 34a is connected to the line 22.

Considering the device in the state in which the flip-flop 31a, 32a is providing a 'zero' signal i.e. an inhibiting signal at the respective input of the gate 34a and the flip-flop 38a is providing a '1' signal at the respective input of the gate 34a, if there is no pulse signal present on the line 10a, then a '1' signal will be present on the output of the gate 30a, whatever the condition of line 20. Thus a pulse appearing on the line 20 will have no effect. A succeeding pulse on the line 22 will have no effect since the gate 34a is inhibited by the flip-flop 31a, 32a and as a result a '1' signal will remain at the output of the gate 34a and a zero signal will remain at the output 12a. On the occurrence of a succeeding pulse on the line 24 the output of the gate 42a will change from a '1' to a 'zero' providing a re-setting signal to the flip-flop 31a, 32a and a setting signal to the flip-flop 38a but since those are already in their re-set and set conditions respectively there will be no change, so that as long as there is no pulse signal at the input 10a.

Suppose now that a pulse signal appears on the input 10a, let us say immediately after the termination of a pulse on the line 20. The sequence will be exactly as before (except that the output of the gate 42a will not change to 'zero' on the appearance of a pulse on the line 26) and the state of the device so far described will be unchanged until the next pulse on line 20 appears. The pulse on the line 10a will still be present since the minimum pulse length is greater than four times the oscillator period. At the occurrence of the pulse on the line 20, the output of the gate 30a will change to 'zero', setting the flip-flop 31a, 32a, so that the inhibiting signal applied thereby to the gate 34a is removed so that on the occurrence of the next pulse on the line 22, the latter pulse will be gated through the gate 34a and invertor 36a to provide at the output 12a a '1' pulse signal of the same duration as the corresponding oscillator pulse.

The latter signal will also re-set the flip-flop 38a so that the latter will now provide an inhibiting signal to the gate 34a.

While the pulse signal remains on the input 10a the flip-flop 31a, 32a and 38a can never be re-set and set by the gate 42a during continued running of the oscillator so that no more than one pulse at the output 12a can be produced as a result of a single pulse at the input 10a.

The input 10b and output 12b are connected to a circuit unit identical with that to which the input 10a is connected, the corresponding parts being similarly numbered but having the suffix b instead of the suffix a. However the gate 30b has one of its inputs connected to the line 22, the gate 34b has its remaining input connected to the line 24 and the gate 42b has its other input connected to the line 26.

Thus each signal on the output 12a is coincident with a pulse on the line 22 while each signal on the output 12b is coincident with a pulse on the line 24. The flip-flops 38a and 38b have further re-set inputs connected to an initial re-set line 50.

Figure 2:
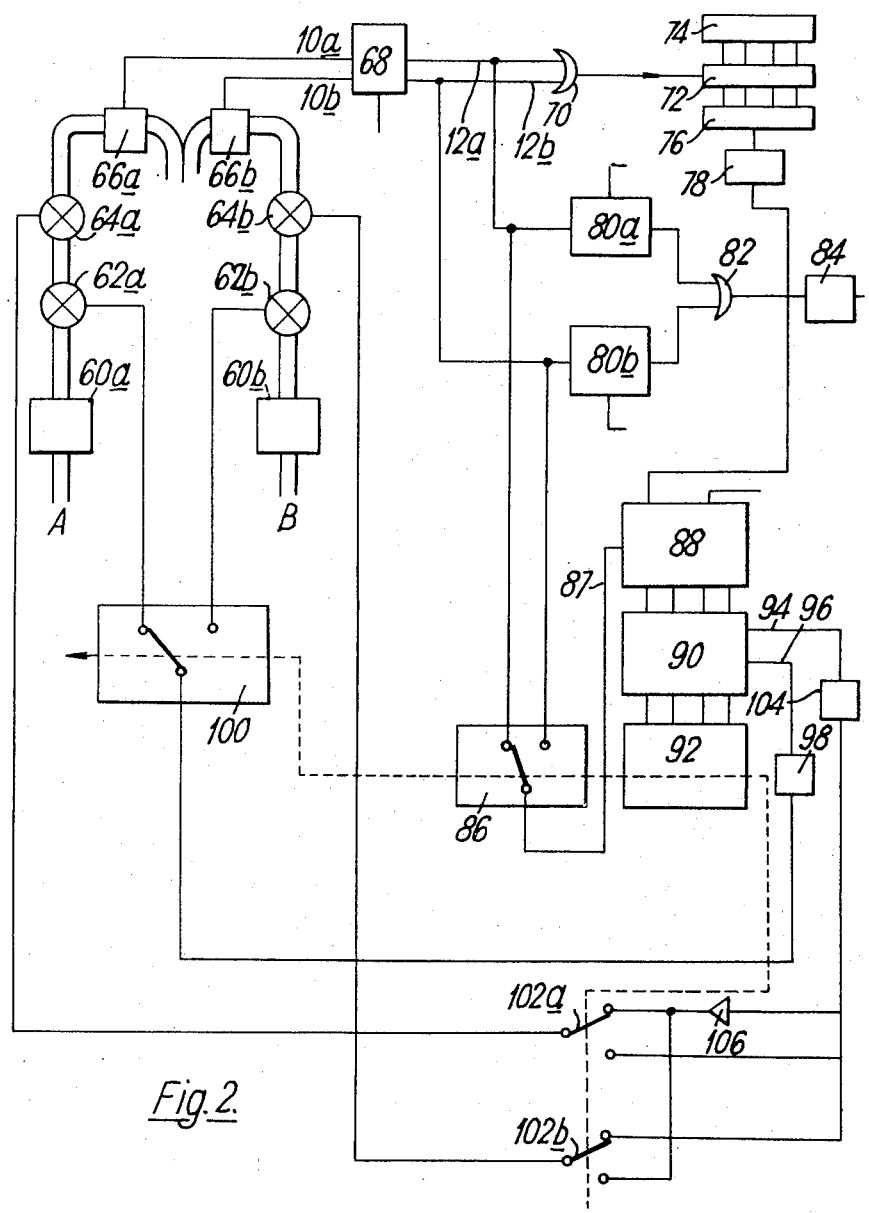
FIG. 2 is a schematic diagram of a fuel blending and costing apparatus using the device of FIG. 1.

Referring to FIG. 2 there is shown an apparatus for producing various blends of two grades of fuel, A and B and for measuring and indicating the total volume and calculating and indicating the corresponding cost to the customer.

The apparatus includes two pumps 60a and 60 b for the respective fuel grades, the pumps feeding respective fuel lines in which are disposed respective stop valves 62a and 62b which are either fully open or fully closed, respective flow reduction valves 64a and 64b which are either fully open or partially closed, and respective transducers 66a and 66b each arranged to provide a series of pulses to a respective input 10a or 10b of the device of FIG. 1, which is indicated at 68. Downstream of the valves and transducers the fuel lines unite and are connected to a single dispensing nozzle (not shown). Each pulse from each transducer corresponds to a predetermined unit of volume of the respective fuel passed through the respective flow line.

The outputs 12a and 12b of the device 68, (which is hereafter called a pulse capture unit) are connected to respective inputs of an 'OR' gate 70, the output of which is connected to a counter 72 driving a display 74 indicating the total volume of fuel dispensed in a dispensing operation. The counter 72 also drives a fraction decoder 76, (the function of which will be described later), the decoder in turn controlling a start signal generator 78.

The outputs 12a and 12b are also connected to respective costing units 80a and 80b, which may be constructed as described in my co-pending application Ser. No. 216,670, filed Jan. 10, 1972, 10249/70, or No. 41764/71 or No.41765/71.

Each of these costing units provides for a train of input pulses each representing a unit of volume of the fuel grade concerned, a train of output pulses each representing a unit of currency in the corresponding cost of the fuel concerned.

Since the pulses on the outputs 12a and 12b are non coincident they can be added together via the 'OR' gate 70 in the counter 72 without error, similarly since the output of each costing unit 80a is synchronised with the input pulses applied thereto and since the latter are never coincident for the two costing units, the output pulses of the costing units are non coincident. These output pulses are passed to respective inputs of an 'OR' gate 82, the output of which is connected to the input of a counter and display 84, so that the latter will indicate the total cost of the fuel dispensed in a dispensing operation.

The outputs 12a and 12b are also connected to respective contacts of a two way switch 86 having an output line 87 connected to a counter 88. In one position of the switch 86 the output 12a is connected to the input of the counter 38 while in the other position of the switch 86 the output 12b is connected to the input of the counter 88. The counter 88 is also connected to a binary number comparator 90 which is also connected to a blend select unit 92. The blend select unit is arranged in response to a manual selection of the desired blend made thereon to present to the comparator 90 a corresponding number. The number system utilised by the counter 88, the comparator 90 and the blend select unit 92 may be binary or binary coded decimal.

The comparator 90 is arranged to provide on an output line 94 thereof a signal when the count in the counter 88 becomes equal to the number presented by the unit 92 and is arranged when the count in counter 88 reaches a value equal to a predetermined fraction, e.g. 80 to 90 percent, of the number presented by the unit 92, to provide a signal on a line 96 thereof.

The line 96 is connected to a signal generator 98 having an output connected to an input of the two way switch 100, which in one position connects the output of the generator 98 with the valve 62a and in its other position connects the output of the generator 98 with the valve 62b. The valves 62a and 62b are of course electrically operated as are the valves 64a and 64b.

The control inputs of the valves 64a and 64b are connected to the inputs of respective two way switches 102a and 102b, each of which in one position thereof connects the respective valve 64a, 64b directly with a line connected to the output of a signal generator 104, having its input connected to the output 94. In the other positions of the switches 102a, 102b the respective valves 64a and 64b are connected to the output of an invertor 106 having its input connected to the output of the generator 104.

The arrangement is such that when a signal appears on the line 94, if the valve 64a or 64b is connected to the input of the invertor 106 then the respective valve 64a or 64b will be moved from its position permitting full flow through the respective fuel line to its position permitting only reduced flow through said line, whereas if the valve 64a or 64b is connected directly to the output of the generator 104, the respective valve 64a or 64b will be moved from its position permitting only reduced flow to its position permitting full flow.

In either case the valves 64a or 64b will change back to their initial positions on removal of the signal at the output 94. Similarly on the appearance of a signal at the output 96, the valve 62a or 62b connected by the switch 100 to the output of the generator 98 is moved from its open to its closed position and on the removal of said signal returns to its open position. Whichever valve 62a, 62b has its control input isolated by the switch 100 is open.

The blend select unit 92 is arranged when a blend selection is made thereon, to move the switch 86 to the position in which the counter 88 is connected to the output 12a or 12b which is associated with the transducer 66a or 66b in whichever of the fuel lines is the line for the fuel grade which forms the minor component of the blend selected, (which grade is hereinafter referred to as the minor grade). At the same time the unit 92 moves the switch 100 to the position in which the signal generator 98 is connected to the stop valve for the minor grade, and moves the switches 102a and 102b to the positions in which the switch 102a or 102b connected with the minor grade valve 64a or 64b is connected to the output of the invertor 106, and in which the other switch 102a or 102b is connected directly to the output of the signal generator 104.

The switches 86, 100, 102a and 102b are ganged in practice as shown by the dotted line, so that they are all switched over in unison by the unit 92. The switches may be either mechanical or electronic in nature.

In the position shown in FIG. 2 the grade A has been selected as the minor grade.

Let us suppose that each of the transducers 66a and 66b is arranged to provide 200 pulses per gallon of the respective fuel grade dispensed and that it is desired that the blend should be accurate if a whole number of tenths of a gallon of blended fuel is dispensed. In this case for every 20 pulses added to the count in the counter 72 a signal will be passed to the start signal generator 78, the output of which is connected to a reset input of the counter 88.

On receipt of a signal from the decoder 76 the signal generator 78 passes a signal to the counter 88 to re-set the latter to 'zero'. In the example chosen let us suppose that it is desired to dispense a blend of 3 parts grade B, to 1 part grade A. The unit is set accordingly and the switches 86, 100 and 102 are set in the positions shown for grade A as the minor grade.

The unit 92 presents signals representing the number 5 to the comparator 90. The unit 68, the counter 72 and the costing units 8a and 80b are set to 'zero' at the beginning of the dispensing operation by signals applied to reset inputs thereof while the counter 88, for reasons connected with the nature of the logic circuitry used, is set to its maximum count, a number higher than that presented by the unit 92. These re-set signals may, for instance, be generated by the closing of a switch on lifting of a dispensing nozzle before fuel dispensing begins. Thus at this stage there are signals both on the lines 94 and 96 so that the valves 62b and 64b are fully open and the valve 62a is closed and the valve 64a is in its position to restrict therethrough. Assuming that dispensing has begun and both pumps 60a, 60b are running a first pulse will be produced by the transducer 66b after one two-hundredth of a gallon of grade B has been dispensed.

Now the decoder 76 is arranged to cause the signal generator to provide a pulse on the arrival at the counter 72 of the first pulse after the initial re-set, so that the counter 88 is set to 'zero' and the signals on the outputs 94 and 96 are removed by the comparator 90 so that the valve 64b is moved to ist 'reduced flow' position, the valve 62a is opened and the valve 64a moved to its 'full flow' position. Both the transducers 66a and 66b are not producing pulses and corresponding pulse trains appear on the outputs 12a and 12b of the pulse capture unit, and are combined in the gate 70 and counted in the counter 72. The two pulse trains lead to corresponding price pulse trains being produced by the costing units 80a and 80b and the total cost is counted up in the counter 84 and clocked up continually on the display thereof.

The pulses from the output 12a are passed to the counter 88 and are counted thereby. After four pulses (in the example under consideration) have been counted by the counter 88 a signal is applied to the output 94 by the comparator 90 so that the pulse generator 104 provides a signal causing the valve 64a to move to its 'reduced flow' position and causing the valve 64b to move to its 'full flow' position, and the next pulse appearing at the output 12a from the minor flow transducer beings the count in the counter 88 to 5 so that the comparator 90 provides a signal also on its output 96 causing the generator 98 to close the valve 62a so that flow of minor grade is cut off entirely. When the count in counter 72 reaches 20 the decoder 76 causes the signal generator 78 to set the counter 88 to 'zero' once more so that the cycle repeats until dispensing ceases. It will be seen that in effect what is done is that a quantity of minor flow grade accurately measured is first mixed with a smaller quantity of major flow grade and the volume then brought up to 0.1 of a gallon by adding further major flow grade, for each whole 0.1 of a gallon dispensed. Thus the blend will be accurate if a whole number of tenths of a gallon have been dispensed except that there may be up to one two-hundredth of a gallon more of grade B in the total volume dispensed than there ought to be for strict accuracy (due to the initial setting of grade A — no flow, grade B — restricted flow). If a whole number of tenths of a gallon have not been dispensed then there may be slightly more of grade A (less than one-fourtieth of a gallon) in the total quantity dispensed than there ought to be in the total quantity dispensed. Asssuming that more than one gallon is dispensed, which will normally be the case in petrol vending applications the accuracy of the blend will be more than adequate. Indeed if the unit 92 and the decoder are arranged so that strict accuracy of blend is obtained only if a whole number of ½ gallons is dispensed, this may well be sufficient for normal applications. It will be appreciated that the smaller the volume is made over which the blend is accurate the nearer one approaches the situation where the blend is accurate for any volume dispensed.

The principal limitation on the closeness with which the latter situation may be approximated is the operating speed of the valves 64a, 64b and 62a, 62b. The operation sequence of the valves, in which the flow reduction valve is operated to reduce the minor grade flow before the minor grade stop valve is operated reduces the error in blending which would be caused by the operating time of the stop valve if only the latter were present.

In the petrol dispensing application assuming a full flow rate for each fuel line of 12 gallons per minute, and assuming that blend ratios of 3:1, 1:1 and 1:3 of grade A to grade B need only be provided, i.e. five grades of fuel in all, counting straight grade A and straight grade B, then if the unit 92 and the decoder 76 are set so that the blend will be accurate over multiples of one-fifth of a gallon; then the minimum period between successive operations of any one of the valves 62a, 62b, 64a or 64b will be more than one second, which is a long time compared with the operating time of the valves of the sleeve type which may be used.

It should be noted that whatever inaccuracies there may be in the blend dispensed, the cost indicated by the display of the counter 84 will be correct since the costs of the actual quantities dispensed from the two fuel lines are calculated separately then added together.

It will be appreciated that the apparatus of FIG. 2 is of use in other applications than that of petrol vending. Indeed the apparatus could be used for blending any two flowable substances, for example liquids, powders or even gases, with any consequent necessary modifications to the valves 62a, 62b, 64a, and 64b and the pumps 60a and 60b or their replacement by equivalent constructions.

In some of these other applications it may be desired to provide for continuous adjustment of the blend over a range, and in this case the unit 92 may be provided with a manually rotatable knob rotation of which continuously changes some variable the change of which is detected by means including an analog to digital convertor providing a digital output to the comparator 90 corresponding to the setting of the knob. As an example the knob may control a variable potentiometer.

In the petrol vending application such refinement is unnecessary and it will be sufficient for the manual setting means of the unit 92 to incorporate a multi-position switch, each position corresponding to a different blend. In its positions corresponding to straight grade A and straight grade B, the unit 92 might be arranged to operate the switches 86, 100 and 102 to select as the minor grade the grade which will not be present in the dispensed fluid and to hold the counter 88 permanently at its maximum count so that the minor grade valve 62a, 62b is permanently closed and both valves in the major flow line are permanently open.

There are various simpler blending and costing devices which may be utilized incorporating the pulse capture unit, in which the pumps for grade A and grade B to be blended are set mechanically to provide a desired blend. In one such device each fuel line has a transducer associated therewith and supplies pulses to respective inputs of a pulse capture device and the outputs of the latter are connected to respective inputs of an 'OR' gate the single output of which is connected to a quantity counter and display and to a single costing unit which is set to calculate and display the cost of the fuel dispensed on the basis of the price per unit volume of the blend selected, said price being selectable in accordance with the blend selected mechanically via the pumps for the two grades.

In this arrangement of course the total price displayed will be correct only if the blend itself is correct, and thus the accuracy of the price displayed depends on the accuracy of the mechanical blending control system.

Another such device differs from that last described only in that instead of a single costing unit being connected to the output of the 'OR' gate receiving the signals from the pulse capture unit, two separate costing units are provided each connected to a respective output of the pulse capture unit, and each being set to calculate the price of the respective quantity of the respective grade dispensed. As with the apparatus of FIG. 2 the outputs of these costing units are added together and the result shown on a final display which will thus display accurately regardless of any inaccuracy in the mechanically controlled blending system.

While the apparatus described has been referred to as operating electronically it will be appreciated that equivalent logic systems operating e.g. pneumatically or hydraulically may be used.

With regard to the apparatus of FIG. 2 it will be appreciated that where the apparatus is to be used for blending other than with a view to sale, the costing units 80a and 80b may be omitted.

I claim:

1. Apparatus for controlling the blending of two flowable substances, comprising separate dispensing means for each of said substances, a control means for at least one of said dispensing means operable selectively to cause said one dispensing means to dispense its respective substance and to arrest dispensing of its respective substance, a transducer associated with each of said dispensing means and arranged to produce a pulse each time a predetermined quantity of the respective substance is dispensed, a pulse capture unit having two inputs each connected to a respective one of said transducers for receiving pulses produced thereby and corresponding outputs at which pulses are produced corresponding to the pulses applied to the corresponding input, said pulses appearing at the respective outputs of said pulse capture unit being noncoincident first counting means for counting the pulses appearing on one of the corresponding outputs of said pulse capture unit and corresponding to the pulses produced by the transducer associated with said one dispensing means, second counting means for counting together the pulses appearing on both of said corresponding outputs of the pulse capture unit, said second counting means having associated therewith means arranged to operate the control means for said one dispensing means each time that a second predetermined number of pulses has been counted by said second counting means since the preceding operation of said control means and said first counting means having associated therewith means arranged to operate said control means for said one dispensing means to cause tha latter to cease dispensing when a first predetermined number of pulses smaller than said second predetermined number has been counted thereby since the preceding operation of said control means by said means associated with said second counting means, the relative mean flow rates of said dispensing means during each period in which both dispensers are dispensing being such that the ratio of the mean flow through said one dispensing means to the mean total flow in said period is greater than the ratio of quantity of substance dispensed by said one dispensing means to the total quantity in the desired blend, and said first and second predetermined numbers being in the last mentioned ratio.

2. The apparatus of claim 1 wherein said pulse capture unit includes respective pulse output means associated with each said input and a respective one of said outputs, pulse sequence means for operating said pulse output means repeatedly at different times, each said pulse output means including means for detecting the occurrence of a pulse signal on its associated input and for storing said signal until operated by said pulse sequence means, each said pulse output means including means for delivering a signal to the associated output, if and only if a signal has occurred at its associated input since the preceding operation thereof by said pulse sequence means said pulse sequence means being arranged so that no two of said pulse output means are operable thereby at the same time, whereby the device will produce at each of said outputs thereof a train of pulses each corresponding to a respective pulse at the associated input of the device and pulses on respective said outputs are noncoincident 3. The apparatus of claim 2 wherein said pulse sequence means has a plurality of control outputs and is arranged to produce pulse signals at said control outputs in a repeating sequence, and each said pulse output means is arranged to be operated to deliver a pulse at the associated output of the device if a signal is stored in said means associated with said output, on the occurrence of a pulse on an associated one of said further outputs of said pulse sequence means.

4. The apparatus of claim 3 wherein said pulse sequence means comprises an oscillator, a counter for counting the periods of said oscillator and a decoder driven by said counter decoder having a plurality of outputs constituting said control outputs of the pulse sequence means, the decoder being arranged to apply pulse signals in a repeating sequence to said control outputs thereof as successive oscillator periods are counted by said counter.

5. The apparatus of claim 3 for use where the pulse length and pulse interval of the pulses to be applied to any one of said inputs is always greater than a predetermined period, wherein said pulse sequence means is so arranged that said sequence is repeated in a period no greater than said predetermined period, wherein there are at least three control outputs of said pulse sequence means and wherein each said pulse output means is constituted by a circuit unit including first gating means having one output and at least three inputs, means connecting one said input to one of said control outputs of said pulse sequence means, first and second bistable means each having an output, a set input, and a re-set input, means connecting the outputs of said first and second bistable means with respective further said inputs of said first gating means, means connecting the output of said first gating means to the respective output of the device, said first gating means being arranged to pass to said output a signal provided on the control output connected to the first gating means only if enabling signals are applied by both of said bistable means to said outputs thereof, means for detecting the coincidence of a signal applied to the associated input of the device with a signal on a further one of said control outputs and for applying a signal to the set input of said first bistable means on detecting such coincidence thereby to set the latter in its state providing an enabling signal at its output, means for applying a signal to the re-set input of said second bistable means to throw the latter into its state providing an inhibiting signal at its output, on the occurrence of a signal at said output of said first gating means and means for detecting the coincidence of the occurrence of a signal on a yet further one of said control outputs with the absence of a signal on the associated input of the device, and for applying a signal to the re-set input of said first bistable means and to the set input of said second bistable means on detection of such a coincidence, said one control output, said further control output and said yet further control output being so selected for each said circuit unit that in said sequence a signal will appear at said yet further one of said control outputs after the appearance of a signal at said further control output, each said circuit unit having its said first gating means connected to a different one of said control outputs of said pulse sequence.

6. The apparatus of claim 5 wherein each said circuit unit comprises a first NAND gate, having an output and two inputs, means connecting one said input to said further control output (with respect to the circuit unit concerned) and means connecting its other said input to the associated input of the device, means connecting the set input of said first bistable means to the output of said first NAND gate, a second NAND gate and means connecting the reset input of said first bistable means and the set input of said second bistable means to the output of a said second NAND gate, said second NAND gate having two inputs, means connecting one of said inputs to said yet further control output (with respect to the circuit unit concerned), an invertor and means connecting the other of said second NAND gate via the invertor to the associated input of the device.

7. The apparatus of claim 1 wherein at least said first predetermined number is variable to vary the proportions of the blend.

8. The apparatus of claim 1 wherein each said dispensing means includes a flow line, and flow controlling means selectively operable to prevent flow of the respective substance therethrough, to restrict flow therethrough to a predetermined extent and to allow unrestricted flow therethrough, both of said dispensing means being arranged to dispense at substantially equal rates in equivalent states of said flow controlling means, and switching means operable alternatively to connect said first counting means to either of said outputs of said device and to vary the control of said flow controlling means by said first and second counter means in such a way that when, in operation of the apparatus said second counting means has counted said second predetermined number of pulses, the flow control means of whichever dispenser has its transducer arranged, by virtue of the state of said switching means, to supply its pulses via said device to said first counter means, is thereby placed in its state allowing unrestricted flow therethrough and thereafter remains in its latter state until at least a substantial proportion of said first predetermined number of pulses have been counted by said first counting means, while at the same time the other of said dispensing means is maintained in its state restricting flow therethrough.

9. The apparatus of claim 8 wherein said control means is arranged at least after cutting off the flow from the dispensing means associated with the transducer providing the pulses counted by said first counter to maintain the flow controlling means of the other dispenser in its state permitting full flow until said second predetermined number of pulses has been counted by said second counting means and thereafter to return the latter flow controlling means to its state permitting only restricted flow.

10. The apparatus of claim 1 wherein said control means includes means arranged when a predetermined proportion of said first predetermined number of pulses has been counted by said first counting means to change the flow controlling means of the dispensing means associated with the transducer providing the pulses being counted by said first counting means to its state permitting only restricted flow and to change the latter flow controlling means to its state preventing flow once said first predetermined number of pulses has been counted by said first counting means.

11. The apparatus of claim 1 wherein said first counting means comprises a counter and has associated therewith means for providing an output signal of a second value when the count in said counter reaches or exceeds said first predetermined number, and otherwise providing an output signal of a first value, and wherein said one dispensing means includes first flow control means having an input arranged to receive the latter output signals, said first flow control means being arranged in the presence of a signal of said second value to prevent flow of the respective substance from said dispenser means and in the presence of a signal of said first value to allow such flow, said second counting means being arranged each time said second predetermined number of pulses has been counted thereby to pass a re-setting signal to said first counting means to re-set the latter to zero.

12. The apparatus of claim 11 wherein said means associated with said counter in said first counting means includes register means in which said first predetermined number can be set, and comparator means arranged to provide said output signal of said second value when the number in said counter equals or exceeds the number in said register and otherwise to provide a signal of said first value.

13. The apparatus of claim 12 wherein said register means includes means for selecting the dispensing means which passes the substance providing the minor portion of the desired blend as said one dispensing means which includes first flow control means having an input to receive the output signal from said comparator.

14. The apparatus of claim 11 wherein each said dispensing means has associated therewith respective flow controlling means having a first and a second input and means arranged in the presence of a signal of a first value on both of said inputs to allow unrestricted flow through said dispensing means, arranged in the presence of a signal of said first value on said first input and a signal of a second value on said second input to allow restricted flow through said dispensing means, and arranged in the presence of a signal of said second value on said first input to prevent flow through said dispensing means, said comparator means being arranged to provide said output signal of said second value on a first output line associated therewith when the count in said first counter means equals or exceeds said first predetermined value thereof, said comparator means further being arranged to provide an output signal of said second value on a second output line associated therewith when the count in said first counter means reaches or exceeds a predetermined proportion of said first predetermined number and otherwise to provide on said second output line a signal of said first value, switching means operable to selectively connect said second input of one of said flow controlling means to said second output line and at the same time to connect said second input of the flow controlling means not so connected to the output of invertor means connected to said second output line, further switching means operable to selectively connect one of the outputs of said pulse capture unit to said counter means and yet further switching means operable to selectively connect said first input of one of said flow controlling means with said first output line of said comparator means, said switching means being ganged so that if the first input of the flow controlling means, of one of said dispensing means is connected to said first output line, the first counter means is connected to count the pulses from the transducer of the latter dispensing means and said second input of the latter flow controlling means is connected to the output of said invertor means, whereas said second input of the other flow controlling means is connected to said second output line whereby as long as the count in said first counter is less than said predetermined proportion of said predetermined number, the dispensing means whose transducer is providing the pulses being counted by said first counting means has its flow controlling means set to allow full flow while the other dispensing means has its flow controlling means set to allow restricted flow, and whereby when said predetermined proportion has been reached the dispensing means whose transducer is providing the pulses being counted by said first counter means has its flow controlling means set to restrict flow, while the other flow controlling means is set to allow full flow, and when said first predetermined number is reached the dispensing means whose transducer is providing the pulses being counted by said first counter means has its flow controlling means set to prevent flow.

15. The apparatus of claim 1 wherein each output of said pulse capture unit is also connected to a respective calculating device adapted to function as a divider the divisor of which is selected to correspond to the price per unit quantity of the respective substance, the outputs of said calculating devices being added via an OR gate in a counter whereby the price of the total amount of the blended substances dispensed is counted.

* * * * *